(12) United States Patent
Nishioka et al.

(10) Patent No.: US 9,365,726 B2
(45) Date of Patent: Jun. 14, 2016

(54) INK COMPOSITION, INKSET, RECORDING APPARATUS, AND RECORDING METHOD

(71) Applicant: Seiko Epson Corporation, Tokyo (JP)

(72) Inventors: Daisuke Nishioka, Yokohama (JP); Hiroko Hayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 187 days.

(21) Appl. No.: 13/760,456

(22) Filed: Feb. 6, 2013

(65) Prior Publication Data

US 2013/0201265 A1 Aug. 8, 2013

(30) Foreign Application Priority Data

Feb. 6, 2012 (JP) ................................. 2012-022926
Dec. 7, 2012 (JP) ................................. 2012-267972

(51) Int. Cl.
| *G01D 11/00* | (2006.01) |
| *C09D 11/30* | (2014.01) |
| *C09D 5/00* | (2006.01) |
| *C09D 11/54* | (2014.01) |
| *C09D 11/322* | (2014.01) |
| *C09D 11/40* | (2014.01) |

(52) U.S. Cl.
CPC ................ *C09D 5/00* (2013.01); *C09D 11/322* (2013.01); *C09D 11/40* (2013.01); *C09D 11/54* (2013.01)

(58) Field of Classification Search
CPC ................................. C09D 11/54; C09D 11/03
USPC .................................... 106/31.13, 31.27, 31.6
See application file for complete search history.

(56) References Cited

U.S. PATENT DOCUMENTS

| 6,030,441 | A | 2/2000 | Kubota et al. | |
| 6,439,708 | B1* | 8/2002 | Kato et al. | 347/98 |
| 2001/0009933 | A1 | 7/2001 | Miyabayashi | |
| 2004/0032473 | A1* | 2/2004 | Ishimoto | B41J 2/2114 347/100 |
| 2012/0156449 | A1 | 6/2012 | Tateishi et al. | |
| 2012/0320121 | A1* | 12/2012 | Arai et al. | 347/20 |

FOREIGN PATENT DOCUMENTS

| JP | 6009714 A | 1/1994 |
| JP | 11-012519 A | 1/1999 |
| JP | 2001220526 A | 8/2001 |
| JP | 2001-310937 A | 11/2001 |
| JP | 2003-082263 A | 3/2003 |
| JP | 2005-015813 A | 1/2005 |
| JP | 2005-279991 A | 10/2005 |
| WO | 2011-027842 A1 | 3/2011 |

* cited by examiner

*Primary Examiner* — Veronica F Faison
(74) *Attorney, Agent, or Firm* — Nutter McClennen & Fish LLP; John J. Penny, Jr.; Alex Nagorniy

(57) ABSTRACT

The ink composition of the invention is applied to a region to which a color ink composition has been applied. The ink composition contains a weather resistance enhancer, is substantially free from a colorant, and is applied to a recording medium to form a coating film exhibiting an integrated value of light transmittance of not more than 2000 for each nanometer at wavelengths of 320 nm to 360 nm and an integrated value of light transmittance of not less than 36000 for each nanometer at wavelengths of 380 nm to 780 nm.

7 Claims, No Drawings

INK COMPOSITION, INKSET, RECORDING APPARATUS, AND RECORDING METHOD

BACKGROUND

1. Technical Field

The present invention relates to an ink composition, an ink set containing the ink composition, a recording method involving use of the ink composition, and a recorded matter produced with the ink composition.

2. Related Art

A variety of methods for recording images on recording media have been traditionally known. In an ink jet recording method, for example, fine ink droplets are ejected from a nozzle opening of an ink jet recording head to record images and characters on recording media.

In order to keep high image quality for a long period, images recorded on recording media need to have characteristics such as satisfactory color development, light resistance, and water resistance. In a technique disclosed in JP-A-2005-15813, for instance, cyan, magenta, and yellow ink compositions containing specific pigments which can impart satisfactory color development, light resistance, and water resistance are used for recording, which enables high image quality to be kept for a long period.

In the ink and ink set disclosed in JP-A-2005-15813, the characteristics of the ink composition, such as color development, light resistance, and water resistance, however, depend on the structure of the colorant itself, such as a structure contributing to color development or a structure exhibiting unsatisfactory ultraviolet resistance or water resistance; thus, a colorant which serves for high color development but exhibits unsatisfactory light and water resistance cannot be used. Use of such a colorant problematically causes difficulty in keeping high image quality for a long period without discoloration.

Yellow colorants exhibit unsatisfactory light resistance as compared with cyan and magenta colorants, and only limited types of colorants can be used in outdoor environment in which a recorded matter is directly exposed to sunlight and rain. Long-term use of such yellow colorants in outdoor environment involves additional treatment such as lamination, which disadvantageously requires further time and expense and unwanted production processes.

SUMMARY

An advantage of some aspects of the invention is that it provides an ink composition which can be used in both indoor and outdoor environments while exhibiting satisfactory color development, light resistance, and water resistance. Another advantage of some aspects of the invention is that it provides an ink set, a recording apparatus, and a recording method.

Some aspects of the invention have the following advantages and applications.

A first aspect of the invention provides an ink composition at least containing a weather resistance enhancer, wherein the ink composition is substantially free from a colorant and is applied onto a recording medium to form a coating film satisfying Requirements (1) and (2):

Requirement (1): an integrated value of the light transmittance of the coating film for each nanometer is not more than 2000 at wavelengths of 320 nm to 360 nm, and Requirement (2): an integrated value of the light transmittance of the coating film for each nanometer is not less than 36000 at wavelengths of 380 nm to 780 nm.

The ink composition according to the first aspect of the invention is applied onto a color ink, which enables protection of a colorant from ultraviolet light owing to an effect provided by Requirement (1) and protection of the color ink from water owing to an effect provided by Requirement (2) without a decrease in color development in a visible light region. Consequently, the quality of images can be maintained for a long period without being impaired.

It is preferable that the ink composition have water or solvent content of at least 50%, wherein the ink composition is applied onto a recording medium to form a coating film satisfying Requirement (3):

Requirement (3): an integrated value of the light transmittance of the coating film for each nanometer is not more than 1500 at wavelengths of 360 nm to 380 nm.

Light with a wavelength of approximately 365 nm is generally used for curing of an ink which is cured through polymerization of monomers by irradiation with ultraviolet light; hence, in the case where light transmittance in this wavelength region is small, a necessary amount of energy becomes larger than that of curing energy in a normal case, which causes defective curing. In contrast, an ink which contains a large amount of water or solvent and is cured by penetration, evaporation, application of heat, or use of a reaction liquid is free from such defective curing, and light transmittance can be therefore decreased to reduce an amount of ultraviolet light, which enables a reduction in deterioration of the quality of images.

It is preferable that the ink composition contain the weather resistance enhancer composed of at least one material selected from the group consisting of benzotriazole, benzophenone, avobenzone, benzoylmethane, oxybenzone, cerium oxide, zinc oxide, and titanium oxide.

In this case, the light transmittance of a coating film at wavelengths of 320 nm to 380 nm can be reduced while the coating film has high light transmittance at wavelengths of 380 nm to 780 nm, so that the quality of images can be maintained for a long period without being impaired while high color development can be secured.

A second aspect of the invention provides an ink set containing the ink composition and a yellow ink composition containing a yellow colorant.

According to the second aspect of the invention, the ink composition is applied to a recording region of the yellow colorant which generally exhibits small light resistance as compared with cyan and magenta colorants, which can suppress degradation of the yellow colorant and maintain the quality of images for a long period without discoloration.

It is preferable that the yellow colorant contained in the yellow ink composition be at least one material selected from the group consisting of C.I. Pigment Yellow 14, C.I. Pigment Yellow 17, C.I. Pigment Yellow 74, C.I. Pigment Yellow 109, C.I. Pigment Yellow 120, C.I. Pigment Yellow 150, C.I. Pigment Yellow 155, C.I. Pigment Yellow 180, C.I. Pigment Yellow 185, C.I. Pigment Yellow 213, a pigment having a structure represented by Formula (1), tautomers of the pigment having the structure represented by Formula (1), salts of the pigment having the structure represented by Formula (1), and hydrates of the pigment having the structure represented by Formula (1),

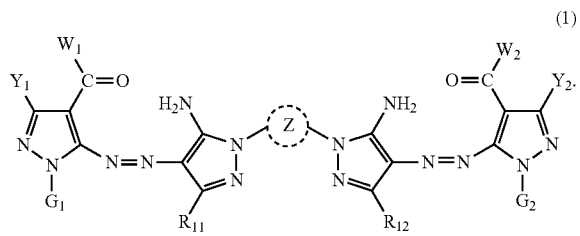

(1)

The ink composition is applied to a recording region of the yellow colorant which generally exhibits small light resistance as compared with cyan and magenta colorants, which can suppress degradation of the yellow colorant and maintain the quality of images for a long period without discoloration.

It is preferable that the ink set further contain a cyan ink composition containing a colorant composed of phthalocyanine and a magenta ink composition containing a colorant composed of quinacridone.

The ink composition is applied to a recording region of the yellow colorant which generally exhibits small light resistance as compared with cyan and magenta colorants, which can suppress degradation of the yellow colorant and maintain the quality of images for a long period without discoloration.

A third aspect of the invention provides a recording method including use of the ink set, wherein the ink composition is applied at least onto the yellow ink composition.

According to the third aspect of the invention, the ink composition is applied to a recording region of the yellow colorant which generally exhibits small light resistance as compared with cyan and magenta colorants, which can suppress degradation of the yellow colorant and maintain the quality of images for a long period without discoloration.

It is preferable that the ink composition be used to form a coating film having a thickness of 50 nm to 300 nm in the recording method.

In this case, the recording method enables production of a recorded matter which can exhibit satisfactory color development, light resistance, and water resistance and be preserved in both indoor and outdoor environments for a long period.

It is preferable that the recording method further include preparing a recording medium which exhibits poor absorbability or non-absorbability to ink and heating the coating film of the ink composition which has been applied onto the yellow ink composition.

A fourth aspect of the invention provides a recording apparatus configured to record an image by the recording method.

According to the fourth aspect of the invention, the recording apparatus enables production of a recorded matter which exhibits satisfactory color development, light resistance, and water resistance and can be preserved in both indoor and outdoor environments for a long period.

DESCRIPTION OF EXEMPLARY EMBODIMENTS

Preferred embodiments of the invention will now be described. Embodiments hereinafter described are examples of the invention. The invention should not be limited to the embodiments described below and can be variously modified within the scope of the invention.

First Embodiment
1. Ink Set

An ink composition of an embodiment of the invention contains a weather resistance enhancer and is substantially free from a colorant (the ink composition is hereinafter referred to as a protective ink composition). An ink set containing such an ink composition optionally contains a yellow ink composition, a cyan ink composition, and a magenta ink composition.

1.1. Protective Ink Composition

The protective ink composition of the present embodiment contains a weather resistance enhancer.

The protective ink composition of the present embodiment is applied to a region in which a color ink composition (ink composition containing a colorant such as a dye or pigment) has been applied. The application of the protective ink composition onto the color ink composition can reduce exposure of the color ink composition to ultraviolet light. In addition, application of the protective ink composition to a region to which a yellow colorant has been applied yields a highly satisfactory effect.

The ink composition may be applied to a region on a recording medium to which ink has not been applied.

The protective ink composition of the present embodiment is substantially free from a colorant (e.g., a pigment or a dye). After volatilization of a volatile component contained in the protective ink composition, a clearly transparent or semi-transparent image is therefore formed.

The term "substantially free from a colorant" herein means that a colorant is not intentionally added during preparation of the ink composition or that the colorant has a limit in the contained amount so as not to sufficiently provide its benefit on purpose. The ink composition therefore may contain a slight amount of colorant unavoidably contained or generated during preparation or preservation of the ink composition. In specific examples of the term "substantially free from a colorant", a colorant content is less than 1.0 mass %, preferably less than 0.5 mass %, more preferably less than 0.1 mass %, further preferably less than 0.05 mass %, and even further preferably less than 0.01 mass %. Components contained in the protective ink composition of the present embodiment will now be described in detail.

1.1.1. Weather Resistance Enhancer

The ink composition of the present embodiment contains a weather resistance enhancer. The weather resistance enhancer functions to enhance weather resistance, and examples thereof include ultraviolet absorbers, ultraviolet scattering agents, photostabilizers, and antioxidants. Ultraviolet absorbers function to absorb light such as ultraviolet light and then convert the absorbed light into vibrational energy or thermal energy. Ultraviolet scattering agents function to scatter light such as ultraviolet light to decrease an amount of ultraviolet light reaching a colorant or another component. Photostabilizers and antioxidants function to trap free radicals generated by light energy. Addition of these types of weather resistance enhancers can enhance the weather resistance of a colorant protected by the protective ink composition.

The protective ink composition contains at least one weather resistance enhancer composed of a material selected from the group consisting of benzotriazole, benzophenone, salicylate, avobenzone, hindered amine, benzoylmethane, oxybenzone, cerium oxide, zinc oxide, and titanium oxide. Preferred are benzotriazole, zinc oxide, and cerium oxide. Such weather resistance enhancers have a small effect on color development and advantageously enhance the light resistance of a colorant. It is believed that such effects are provided because the weather resistance enhancer absorbs ultraviolet light with wavelengths of 320 nm to 380 nm and is less likely to absorb visible light with wavelengths of 380 nm to 780 nm.

Examples of the weather resistance enhancer composed of benzotriazole include, but are not limited to, 2-(2'-hydroxy-4'-octoxyphenyl)benzotriazole, 2-(2'-hydroxy-3'-t-butyl-5'-methylphenyl)-5-chlorobenzotriazole, 2-(2'-hydroxy-3'-t-butyl-5'-octylphenyl propionate)-5-chlorobenzotriazole, 5'-octylphenyl propionate-5-chlorobenzotriazole, 2-(2'-hydroxy-5'-methylphenyl)benzotriazole, 2-(2'-hydroxy-5'-t-butylphenyl)benzotriazole, 2-(2'-hydroxy-3',5-di-t-butylphenyl)benzotriazole, 2-(2'-hydroxy-3',5-di-t-butylphenyl)-5-chlorobenzotriazole, 2-(2'-hydroxy-3',5-di-t-amylphenyl), and 2-[2-hydroxy-3,5-di(2,2-dimethylbenzine)-phenyl]-2H-benzotrizole.

Examples of the weather resistance enhancer composed of benzophenone include, but are not limited to, 2-hydroxybenzophenone, 2,4-dihydroxybenzophenone, 2-hydroxy-4-methoxybenzophenone, 2-hydroxy-4-methoxy-2'-carboxybenzophenone, 2-hydroxy-4-methoxy-5-sulfobenzophenone trihydrate, 2-hydroxy-4-octoxybenzophenone, 2-hydroxy-4-octadecyloxybenzophenone, 2-hydroxy-4-methoxybenzophenone-5-sulfonic acid, 2-hydroxy-4-dodecyloxybenzophenone, 2,2'-dihydroxy-4-methoxybenzophenone, 2,2'-dihydroxy-4,4'-dimethoxybenzophenone, 2,2',4,4'-tetrahydroxybenzophenone, sodium 2,2'-dihydroxy-4,4'-dimethoxy-5-sulfobenzophenone, and 5-chloro-2-hydroxybenzophenone.

Examples of the weather resistance enhancer composed of salicylate include, but are not limited to, phenyl salicylate, p-t-butylphenyl salicylate, and p-octyl salicylate.

Examples of the weather resistance enhancer composed of hindered amine include, but are not limited to, bis(1,2,2,6,6-pentamethyl-4-piperizyl)2-(3,5-di-t-butyl-4-hydroxybenzyl)-2'-n-butyl malonate, bis(1,2,2,6,6-pentamethyl-4-piperidyl) sebacate, and tetrakis(2,2,6,6-tetramethyl-4-piperidyl)-1,2,3,4-butanetetracarboxylate.

Examples of the weather resistance enhancer composed of benzoylmethane include, but are not limited to, t-butyl methoxydibenzoylmethane, 4-methoxy-4'-t-butyl-dibenzoylmethane, and dibenzoylmethane.

Examples of the weather resistance enhancer composed of oxybenzone include, but are not limited to, oxybenzone and dioxybenzone.

A wavelength region from 320 nm to 380 nm corresponds to UV-A being an ultraviolet region which broadly includes ultraviolet rays derived from sunlight. Since colorants may be impaired by being exposed to ultraviolet rays, absorption of ultraviolet rays can prevent colorants from being impaired. Hence, light transmittance at wavelengths of 320 nm to 360 nm is integrated for each nanometer, and an integrated value of not more than 2000 can reduce exposure of colorants to ultraviolet light, which leads to an enhancement of weather resistance.

A yellow colorant itself absorbs light beams with wavelengths of approximately 350 nm to 450 nm and absorbs a large amount of ultraviolet light as compared with cyan and magenta colorants; thus, the weather resistance enhancer which reduces exposure of the colorant to ultraviolet light is likely to further enhance weather resistance.

The smaller the degree of exposure of the colorant to ultraviolet light, the more degradation of the colorant can be reduced; hence, the integrated value of light transmittance is preferably not more than 1200, more preferably not more than 500.

A wavelength region from 380 nm to 780 nm corresponds to a region of visible light which human beings can see; if light within this wavelength region has small transmittance, color development is impaired. It is therefore preferred that light with wavelengths of 380 nm to 780 nm have large transmittance; a light transmittance of not less than 36000 can prevent a large decrease in color development. In order to further prevent a decrease in color development, preferred is not less than 38000, and more preferred is not less than 39000.

Light with a wavelength of approximately 365 nm is generally used to cure inks curable through polymerization of monomers by irradiation with ultraviolet light; in the case where ultraviolet light with a wavelength ranging from 360 nm to 380 nm has small transmittance, an ordinary amount of curing energy causes defective curing. Since a necessary amount of curing energy therefore becomes larger as compared with a normal case, light transmittance in such a wavelength region cannot be decreased. Hence, an ink containing a large amount of water or solvent and cured by penetration, evaporation, application of heat, or use of a reaction liquid is free from such defective curing and therefore more preferred than ultraviolet curable inks.

In particular, the ink composition preferably has a water or solvent content of not less than 50% or is substantially free from a polymerizable compound. The term "being substantially free" includes a case in which a substance is contained so as not to sufficiently provide its benefit on purpose. In examples of such a case, a polymerizable compound content is not more than 10 mass %, preferably not more than 5 mass %, more preferably not more than 1 mass %, and further preferably not more than 0.1 mass %.

Examples of the polymerizable compounds include radically polymerizable compounds and cationically polymerizable compounds. Examples of the radically polymerizable compounds include allyl compounds and preferably include allyl ether compounds, ethylene glycol monoallyl ether, trimethylolpropane diallyl ether, trimethylolpropane monoallyl ether, glycerol monoallyl ether, allyl glycidyl ether, pentaerythritol triallyl ether, and N-vinyl compounds. Examples of the cationically polymerizable compounds include epoxy compounds, vinyl ether compounds, and oxetane compounds disclosed in JP-A-6-9714, JP-A-2001-310937, and JP-A-2001-220526.

Any other weather resistance enhancer may be used, such as p-aminobenzoic acid and derivatives thereof, p-dimethylbenzoic acid and derivatives thereof, salicylic acid, esters of salicylic acid, mentyl anthranilate, cinoxate, methoxycinnamates, and phenyl acrylates.

The weather resistance enhancer preferably has an average particle size ranging from 20 nm to 200 nm, more preferably 20 nm to 100 nm, and further preferably 50 nm to 100 nm. In the case where the weather resistance enhancer has an average particle size within these ranges, especially not more than the upper limit thereof, the applied protective ink is less likely to have unsatisfactory flatness, so that weather resistance can be enhanced while the gloss of color images is maintained.

The weather resistance enhancer content in the ink composition is not specifically limited; a preferred content ranges from 0.1 mass % to 5.0 mass %, and a more preferred content ranges from 0.5 mass % to 2.0 mass %. The weather resistance enhancer content is appropriately determined in view of the type of the enhancer and the integrated value of light transmittance.

The average particle size of the weather resistance enhancer can be measured with a particle size distribution analyzer based on a dynamic light scattering. Examples of such a particle size distribution analyzer include "Microtrac UPA" (commercially available from NIKKISO CO., LTD.) using a heterodyning technique for frequency analysis. The term "average particle size" herein refers to an average particle size on volume basis unless otherwise specified.

1.1.2. Resin

The ink composition of the present embodiment may contain particulate resin. The particulate resin content of the ink composition enables images with satisfactory abrasion resistance to be formed on a recording medium. In particular, the particulate resin is preferably contained in the ink composition of the present embodiment in the form of fine particles (in other words, in the form of emulsion or suspension). The particulate resin contained in the form of fine particles enables the viscosity of the ink composition to be readily adjusted within a preferred range for ink jet recording and enables preservation stability and ejection stability to be readily provided.

Examples of the particulate resin include particulate polymers which function to form a resin film fixed onto a recording medium. Examples of materials of such particulate polymers include polyacrylic acid esters or copolymers thereof, polymethacrylic acid esters or copolymers thereof, polyacrylonitrile or copolymers thereof, polycyanoacrylate, polyacrylamide, polyacrylic acid, polymethacrylic acid, polyethylene, polypropylene, polybutene, polyisobutylene, polystyrene or copolymers thereof, petroleum resins, coumarone-indene resins, terpene resins, polyvinyl acetate or copolymers thereof, polyvinyl alcohol, polyvinyl acetal, polyvinyl ether, polyvinyl chloride or copolymers thereof, polyvinylidene chloride, fluorocarbon resins, fluorocarbon rubber, polyvinylcarbazole, polyvinylpyridine, polyvinylimidazole, polybutadiene or copolymers thereof, polychloroprene, polyisoprene, and natural resins. Among these, especially preferred is resin having both a hydrophobic moiety and a hydrophilic moiety in its molecular structure.

Such particulate polymers may be produced from traditional materials or by typical techniques. Commercially available products may be used, and examples of the commercially available products include Microgels E-1002 and E-5002 (commercially available from Nippon Paint Co., Ltd.); VONCOATs 4001 and 5454 (commercially available from DIC Corporation); SAE1014 (commercially available from ZEON CORPORATION); SAIVINOL SK-200 (commercially available from SAIDEN CHEMICAL INDUSTRY CO., LTD.); and JONCRYLs 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (commercially available from BASF Japan Ltd.).

The above-mentioned particulate polymers may be produced by any one of the methods described below, and these methods may be optionally used in combination: a method which involves mixing a polymerization catalyst (polymerization initiator) and a dispersant with a monomer constituting a predetermined particulate polymer for polymerization (namely, emulsion polymerization); a method which involves dissolving a polymer with a hydrophilic moiety in a water-soluble organic solvent, mixing the resulting solution in water, and then removing the water-soluble organic solvent by distillation or another technique to yield a particulate polymer; and a method which involves dissolving a polymer in a water-insoluble organic solvent and then mixing the resulting solution in an aqueous solution together with a dispersant to yield a particulate polymer. These methods can be appropriately selected depending on the type and characteristics of a polymer to be used. Examples of the dispersant which can be used to disperse the polymer in the form of fine particles include, but are not limited to, anionic surfactants (e.g., dodecylbenzenesulfonic acid sodium salt, lauryl phosphoric acid sodium salt, and polyoxyethylene alkyl ether sulfate ammonium salt); and nonionic surfactants (e.g., polyoxyethylene alkyl ethers, polyoxyethylene alkyl esters, polyoxyethylene sorbitan fatty acid esters, and polyoxyethylene alkyl phenyl ethers). These can be used alone or in combination.

The particulate resin preferably has an average particle size ranging from 5 nm to 400 nm, more preferably 50 nm to 200 nm in view of the preservation stability and ejection stability of the ink composition.

In the case where the particulate resin is contained, the particulate resin content preferably ranges from 0.5 mass % to 10 mass % relative to the total mass of the ink composition. The particulate resin content within such a range can promote curing and fixing of the ink composition onto a recording medium.

1.1.3. Wax Particles

The ink composition of the present embodiment may contain wax particles. Addition of the wax particles can enhance the abrasion resistance of images.

Examples of materials used for the wax particles include plant- or animal-derived waxes such as carnauba wax, candelilla wax, beeswax, rice wax, and lanolin; petroleum waxes such as a paraffin wax, a microcrystalline wax, a polyethylene wax, a polyethylene oxide wax, and petrolatum; mineral waxes such as a montan wax and ozokerite; synthetic waxes such as a carbon wax, a Hoechst wax, a polyolefin wax, and stearic acid amide; natural or synthetic wax emulsions such as α-olefin-maleic anhydride copolymers; and blended waxes. These may be used alone or in combination. Among these waxes, preferred are a paraffin wax and a polyolefin wax, and particularly preferred are a polyethylene wax, polypropylene wax, and paraffin wax. Commercially available products can be used as the wax particles. Examples of the commercially available wax particles include NOPCOTE PEM17 (commercially available from SAN NOPCO LIMITED), CHEMI-PEARL W4005 (commercially available from Mitsui Chemicals, Inc.), AQUACERs 515, 593, and 593 (commercially available from BYK Japan KK).

The wax particles preferably have an average particle size ranging from 5 nm to 400 nm, more preferably 30 nm to 200 nm in view of the preservation stability and ejection stability of the ink composition.

In the case where the wax particles are contained, the wax particle content (solid content) preferably ranges from 0.1 mass % to 5 mass % relative to the total mass of the ink composition. The wax particle content within such a range may further enhance the abrasion resistance of images recorded on a recording medium.

1.1.4. Other Components

The protective ink composition of the present embodiment may further contain water, an aqueous organic solvent, a surfactant, a pH adjuster, a preservative, a fungicide, a corrosion inhibitor, and a chelating agent. Addition of these components further enhances the characteristics of the protective ink composition in some cases.

Water

Preferred examples of the water include pure water and ultrapure water, such as ion-exchanged water, ultra-filtered water, reverse osmosis water, and distilled water. Furthermore, these types of water are preferably subjected to sterilization treatment by irradiation with ultraviolet light or addition of hydrogen peroxide, which prevents generation of funguses and bacteria over a long period.

Aqueous Organic Solvent

Examples of the aqueous organic solvent include polyhydric alcohols and pyrrolidone derivatives. The aqueous organic solvents may be used alone or in combination.

Examples of polyhydric alcohols include ethylene glycol, diethylene glycol, triethylene glycol, polyethylene glycol, polypropylene glycol, dipropylene glycol, propylene glycol, butylene glycol, 1,2-butanediol, 1,2-pentanediol, 1,5-pentanediol, 1,2-hexanediol, 2-ethyl-1,3-hexanediol, 1,6-hexanediol, 1,2-heptanediol, 1,2-octanediol, 1,2,6-hexanetriol, thioglycol, hexylene glycol, glycerin, trimethylolethane, and trimethylolpropane. These polyhydric alcohols can prevent nozzle clogging in the case where the ink composition is ejected from a nozzle opening of an ink jet recording apparatus.

Examples of pyrrolidone derivatives include N-methyl-2-pyrrolidone, N-ethyl-2-pyrrolidone, N-vinyl-2-pyrrolidone, 2-pyrrolidone, and 5-methyl-2-pyrrolidone.

Surfactant

The ink composition containing a surfactant can exhibit proper surface tension and interfacial tension with respect to ink-contacting members of printer, such as a nozzle. Use of such an ink composition in ink jet recording apparatuses can accordingly enhance ejection stability. The surfactant enables ink to uniformly spread on a recording medium.

Preferred surfactants which provide such advantageous effects are nonionic surfactants. Particularly preferred nonionic surfactant is at least one of silicone surfactants and acetylenic glycol surfactants.

Preferred silicone surfactants are polysiloxane compounds such as polyether-modified organosiloxane. Specific examples of the silicone surfactants include BYK-306, BYK-307, BYK-333, BYK-341, BYK-345, BYK-346, and BYK-348 (commercially available from BYK Japan KK); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (commercially available from Shin-Etsu Chemical Co., Ltd.).

Examples of the acetylenic glycol surfactants include Surfynols (registered trademark) 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (commercially available from Air Products and Chemicals, Inc.); Olfines (registered trademark) B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (commercially available from Nissin Chemical Industry Co., Ltd.); and Acetylenols E00, E00P, E40, and E100 (commercially available from Kawaken Fine Chemicals Co., Ltd.).

Anionic surfactants, nonionic surfactants, and amphoteric surfactants may be added in place of the surfactants described above.

pH Adjuster

Examples of the pH adjuster include potassium dihydrogen phosphate, disodium hydrogen phosphate, sodium hydroxide, lithium hydroxide, potassium hydroxide, ammonium, diethanolamine, triethanolamine, triisopropanolamine, potassium carbonate, sodium carbonate, and sodium hydrogen carbonate.

Preservative and Fungicide

Examples of the preservative and fungicide include sodium benzoate, sodium pentachlorophenolate, sodium-2-pyridinethiol-1-oxide, sodium sorbate, sodium dehydroacetate, and 1,2-dibenzisothiazolin-3-one. Examples of commercially available preservative and fungicides include PROXELs XL2 and GXL (commercially available from Arch Chemicals, Inc.) and Denicides CSA and NS-500W (commercially available from Nagase ChemteX Corporation).

Corrosion Inhibitor

The corrosion inhibitor is, for instance, benzotriazole.

Chelating Agent

Examples of the chelating agent include ethylenediaminetetraacetic acid and salts thereof (e.g., disodium dihydrogen ethylenediamine tetraacetate).

1.2. Other Ink Compositions

The protective ink composition of the present embodiment is applied onto a region to which color ink compositions (ink compositions containing colorants such as pigments or dyes) have been applied. Any color ink composition containing a colorant can be used, and ink compositions of an ink set of the present embodiment contain three colorants, respectively: yellow, cyan, and magenta colorants. Components contained in color ink compositions will now be described.

1.2.1. Yellow Colorant

A yellow colorant may be a dye or a pigment, and preferred is a pigment in terms of weather resistance. In view of color development on recording media and weather resistance to light, water, and ozone, preferred yellow pigments are one or more materials selected from the group consisting of C.I. Pigment Yellows 14, 17, 74, 109, 120, 150, 155, 180, 185, and 213; a pigment having a structure represented by Formula (1); tautomers of the pigment having the structure represented by Formula (1); salts of the pigment having the structure represented by Formula (1); and hydrates of the pigment having the structure represented by Formula (1). Especially preferred are one or more materials selected from the group consisting of C.I. Pigment Yellows 74, 155, 180, 185, and 213; the pigment having the structure represented by Formula (1); tautomers of the pigment having the structure represented by Formula (1); salts of the pigment having the structure represented by Formula (1); and hydrates of the pigment having the structure represented by Formula (1). These pigments are compatible with the protective ink composition of the invention, exhibit high weather resistance, and provide satisfactory ejection stability even in the case where being used in an ink jet printer involving a thermal process (described later).

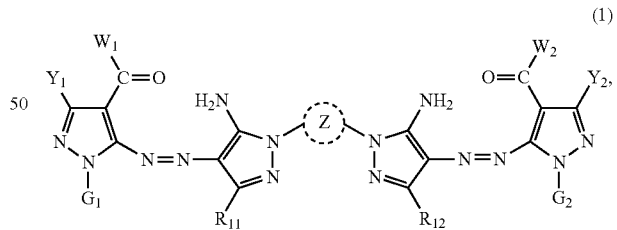

(1)

wherein Z represents atoms constituting 5- to 8-membered nitrogen-containing heterocycles; $Y_1$, $Y_2$, $R_{11}$, and $R_{12}$ each independently represent a hydrogen atom or a substituent; $G_1$ and $G_2$ each independently represent a hydrogen atom, an alkyl group, an aralkyl group, an alkenyl group, an alkynyl group, an aryl group, or a heterocyclic group; and $W_1$ and $W_2$ each independently represent an alkoxy group, an amino group, an alkyl group, or an aryl group.

Z is preferably any of 5- to 8-membered heterocyclic groups, more preferably a substituted or unsubstituted 5- or 6-membered heterocyclic group, and further preferably a 6-membered nitrogen-containing heterocyclic group having 3 to 10 carbon atoms.

Other preferred structures of the pigment and preferred $W_1, W_2, Y_1, Y_2, G_1, G_2, R_{11}$, and $R_{12}$ are the same as disclosed in paragraphs [0026] to [0140] in WO2011/027842.

Preferred examples of the structure of a pigment represented by Formula (1) include structures represented by Formulae (2) and (3).

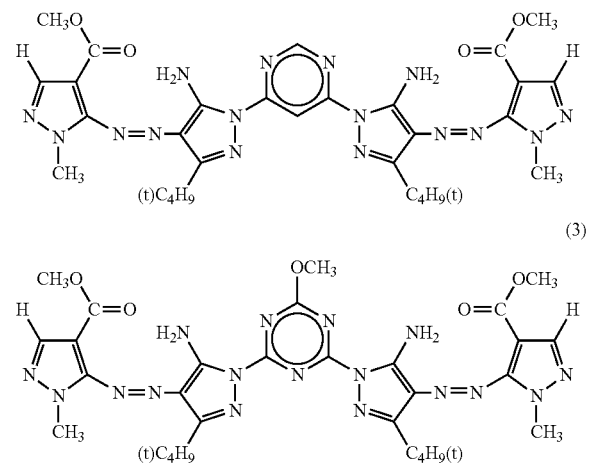

Examples of a dye which can be used as the yellow colorant include C. I. Acid Yellows 1, 3, 11, 17, 19, 23, 25, 29, 36, 38, 40, 42, 44, 49, 59, 61, 70, 72, 75, 76, 78, 79, 98, 99, 110, 111, 127, 131, 135, 142, 162, 164, and 165; C. I. Direct Yellows 1, 8, 11, 12, 24, 26, 27, 33, 39, 44, 50, 58, 85, 86, 87, 88, 89, 98, 110, 132, 142, and 144; C. I. Reactive Yellows 1, 2, 3, 4, 6, 7, 11, 12, 13, 14, 15, 16, 17, 18, 22, 23, 24, 25, 26, 27, 37, and 42; C. I. Food Yellows 3 and 4; and C. I. Solvent Yellows 15, 19, 21, 30, and 109.

1.2.2. Cyan Colorant

Preferred cyan colorants are composed of phthalocyanine. The colorants composed of phthalocyanine have a structure represented by Formula (4), where M represents a metallic atom. Such colorants may be dyes or pigments, and preferred are pigments. Any phthalocyanine can be used; preferably copper phthalocyanine (M is Cu) or aluminum phthalocyanine (M is Al), and more preferably copper phthalocyanine. Examples of the phthalocyanine dye include, but are not limited to, C. I. Acid blue 2490, C. I. Direct Blues 86, 87, and 199. Among these, preferred is C. I. Direct Blue 199. Examples of the phthalocyanine pigment include, but are not limited to, C. I. Pigment Greens 7, 36, and 37 and C. I. Pigment Blues 16, 75, 15:1, 15:2, 15:3, 15:4, 15:5, and 15:6; preferred are C. I. Pigment Greens 7 and 36 and C. I. Pigment Blues 15:1, 15:2, 15:3, 15:4, 15:5, and 15:6, and most preferred are C. I. Pigment Blues 15:1, 15:2, 15:3, 15:4, 15:5, and 15:6.

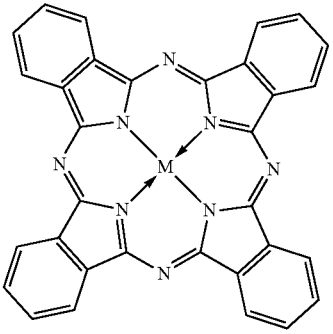

1.2.3. Magenta Colorant

Preferred magenta colorants are composed of quinacridone. The colorants composed of quinacridone have a structure represented by Formula (5). Such colorants composed of quinacridone may be dyes or pigments, and preferred are pigments. Examples of the quinacridone pigment include, but are not limited to, C. I. Pigment Violets 19 and 42; C. I. Pigment Reds 122, 192, 202, 207, and 209; and solid solutions derived from a pigment selected therefrom. Preferred are C. I. Pigment Violet 19; C. I. Pigment Reds 122, 202, and 209; and solid solutions derived from a pigment selected therefrom.

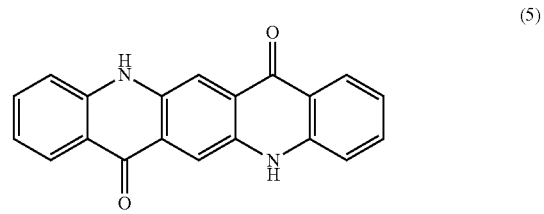 [SMILES: O=c1c2ccccc2[nH]c2cc3c(=O)c4ccccc4[nH]c3cc12]

Since phthalocyanine and quinacridone colorants exhibit more satisfactory weather resistance as compared with general yellow colorants, combined use of the yellow ink composition and the protective ink composition of the invention which can adjust weather resistance enables an ink set to provide a remarkably advantageous effect.

1.2.4. Other Colorants

The color ink composition of the present embodiment may contain other colorants than the above-mentioned colorants for toning.

1.2.5. Other Components

The color ink composition may contain components such as resins, wax particles, and water-soluble organic solvents described in the sections "1.1.2. Resin", "1.1.3. Wax Particles", and "1.1.4. Other Components".

The main solvent of the color ink composition may be water or an organic solvent (e.g., alcohols, ketones, carboxylic acid esters, or ethers).

2. Ink Jet Recording Method

An ink jet recording method of an embodiment of the invention has a process in which droplets of the above-mentioned protective ink composition for ink jet recording are ejected to be applied onto a recording region of a recording medium to which the color ink composition has been applied.

Droplets of the protective ink composition can be ejected, for example, by the following ink jet recording techniques. In a recording technique utilizing electrostatic attraction force, ink droplets are continuously ejected through nozzles while an intense electric field is applied between the nozzles and acceleration electrodes positioned in front of the nozzles, and recording information signals are output to deflection electrodes while the droplets are flying between the deflection electrodes. In this case, ink droplets may be ejected without being deflected depending on the printing information signals. In a piezoelectric technique, pressure is applied to an ink liquid with a small pump, and nozzles are mechanically oscillated with quartz oscillators to forcibly eject ink droplets; or pressure is applied to ink with a piezoelectric device while recording information signals are output, and then ink droplets are ejected for recording. In a thermal jet technique, ink is heated with a microelectrode to generate bubbles in response to recording information signals, and then ink droplets are ejected for recording.

The ink jet recording method of the present embodiment will now be described, in which an ink jet printer is used. The invention should not be limited thereto.

Droplets of the color ink composition are ejected through a nozzle of the recording head of an ink jet printer and applied onto a recording medium. In this process, a recording region to which the color ink composition has been applied is formed on the recording medium. The recording region to which the color ink composition has been applied may be formed by any other technique than the ink jet recording method; for instance, the color ink composition may be applied with a roll coater. Use of a recording medium having a recording region to which the color ink composition has been preliminarily applied enables this process to be omitted.

Droplets of the protective ink composition are ejected through a nozzle and applied onto the recording region on the recording medium to which the color ink composition has been applied. In this process, a recorded matter is produced, in which a clear image is formed with the protective ink composition on the recording region to which the color ink composition has been applied. The protective ink composition may be applied by any other technique than the ink jet recording method; for instance, the protective ink composition may be applied by an analog technique such as use of a roll coater.

The recording medium to which the color ink composition has been applied is covered with the clear image formed with the protective ink composition, which can preserve color development and provide satisfactory weather resistance.

In the ink jet recording method of an embodiment of the invention, droplets of the protective ink composition for ink jet recording can be applied to a recording medium to which the color ink composition has not been applied.

Application of the protective ink composition onto a recording medium can prevent deterioration of the substrate and ink-receiving layer of the recording medium due to exposure to light and water.

Any recording medium can be appropriately used in the ink jet recording method of the present embodiment; for instance, in addition to paper such as plain paper and ink jet paper having an ink-receiving layer, substrates (non-absorbable to ink) in which a region including an ink-applied surface is formed from a variety of plastic materials, ceramics, glass, metal, or composite materials thereof may be used. In the case where the ink composition is subjected to a heating process that will be described later, the ink composition can be desirably applied to a recording medium which exhibits non-absorbability or poor absorbability to ink.

The term "recording media which exhibits non-absorbability or poor absorbability to ink" herein refers to a recording medium that absorbs 10 mL/m$^2$ or lower of water in 30 msec$^{1/2}$ from the time of contact in the Bristow method. The Bristow method has been most widely used as one of quick measurement methods for determining liquid absorption and is also endorsed by Japan Technical Association of the Pulp and Paper Industry (JAPAN TAPPI). The details of this method are specified in Standard No. 51 [Paper and Paperboard-Liquid Absorption Test Method-Bristow's Method (in Japanese)] of *JAPAN TAPPI Paper and Pulp Test Methods edited in* 2000 (in Japanese).

Examples of the recording medium which exhibits non-absorbability to ink include plastic films having no ink-absorbing layer for ink jet recording and materials having substrates, such as paper, which are coated with plastic materials or to which plastic films are bonded. The plastic materials herein used include polyvinyl chloride, polyethylene terephthalate, polycarbonate, polystyrene, polyurethane, polyethylene, and polypropylene. Examples of the recording medium which exhibits poor absorbability to ink include printing paper such as art paper, coated paper, and matt paper. The plastic films may be soft packaging films. The soft packaging films have high flexibility and are used for food packaging and packaging for toiletry products and cosmetics. The flexible packaging film has a surface composed of a material with antifog properties or antistatic properties, an antioxidant, or another material and has a thickness of 5 to 70 µm (preferably 10 to 50 µm).

In a process for applying the protective ink composition onto the recording region to which the color ink composition has been applied, the amount of the protective ink composition to be applied may be changed depending on a variation in the applied color ink composition. The protective ink composition may be applied in a smaller amount onto a recording region to which the cyan and magenta ink compositions have been mainly applied, relative to the amount of the protective ink composition to be applied onto a recording region to which the yellow ink composition being generally sensitive to light has been mainly applied. Furthermore, the protective ink composition may be applied to a recording region to which the yellow colorant has been mainly applied, without being applied onto a recording region to which the magenta and cyan ink colorants have been mainly applied. Each color ink composition can therefore deteriorate at the same rate, which can prevent imbalance between colors due to deterioration of a certain color. The term "mainly" herein means a case in which the application amount of a predetermined colorant is larger than that of the other colorants.

The protective ink composition is applied to form a coating film having a thickness of preferably 50 nm to 300 nm, more preferably 70 nm to 250 nm, further preferably 100 nm to 200 nm, which enables formation of a coating film with a predetermined light transmittance satisfying the above-mentioned integrated value.

The protective ink composition can be applied to a recording medium exhibiting non-absorbability or poor absorbability to ink to desirably form a coating film (weather resistance enhancer) without being absorbed, which can further remarkably yield an advantageous effect of the invention. In the invention, since the protective ink composition is applied onto the color ink composition which has been applied in advance, the total amount of the applied inks is likely to become large per unit area. In order to prevent ink bleed and quickly dry images, a heating process is further preferably provided. For example, the heating process is carried out during recording at a position facing at least an ink jet head which ejects the color ink composition or carried out after completion of recording on a recording medium; the heating process may be a combination thereof. The heating process is carried out in any manner provided that evaporation of a liquid solvent contained in the ink composition is promoted. The heating process involves, for instance, a mechanism for applying heat to a recording medium during application of at least any one of the color ink composition and protective ink composition, a mechanism for exposing the ink composition on a recording medium to wind after recording, or a combination thereof. In particular, the heating process preferably involves forced air heating, radiational heating, conduction heating, high frequency drying, or microwave drying.

In the case where the heating process is carried out at a position facing an ink jet head, the ink composition in the vicinity of the nozzle of the ink jet head (particularly, fine nozzle with a diameter of 10 μm to 30 μm) is quickly dried, which is likely to cause unstable ink ejection. In this case, such a problem is overcome by use of one or more pigments selected from the group consisting of C.I. Pigment Yellows 74, 155, 180, 185, and 213; a pigment having the structure represented by Formula (1); tautomers of the pigment having the structure represented by Formula (1); salts of the pigment having the structure represented by Formula (1); and hydrates of the pigment having the structure represented by Formula (1) as the pigment contained in the yellow ink composition. Since these pigments exhibit satisfactory dispersion stability, ejection stability is maintained even after the heating process is carried out at a position facing an ink jet head.

The heating process can have any temperature range provided that evaporation of a liquid solvent contained in the ink composition can be promoted; a temperature of not less than 40° C. can provide an effect of the heating process, preferably 40° C. to 80° C., and more preferably 40° C. to 60° C. At a temperature exceeding 80° C., depending on the type of recording medium, a problem such as deformation of a recording medium is caused and results in defective transportation of the recording medium after the heating process in some cases, or a recording medium cooled to a room temperature causes a problem such as shrinking in some cases.

3. Examples

The invention will now be described further in detail with reference to Examples and Comparative Examples but should not be limited thereto.

3.1. Preparation of Protective Ink Composition

Components shown in Table 1 (resin, an ultraviolet absorber, and other components) were mixed and stirred to prepare protective ink compositions. In Table 1, the amount of each of resin, wax, and weather resistance enhancer indicates its solid content. The components in Table 1 are as follows.

Weather Resistance Enhancer
Weather Resistance Enhancer 1 (ultraviolet absorber composed of benzotriazole, average particle size: 81 nm);
Weather resistance enhancer 2 (cerium oxide, product name "NANOBYK 3810", average particle size: 10 nm);
Weather resistance enhancer 3 (ultraviolet absorber composed of zinc oxide, average particle size: 90 nm);
Weather resistance enhancer 4 (photostabilizer composed of benzoate, average particle size: 110 nm); and
Weather resistance enhancer 5 (ultraviolet absorber composed of triazine, average particle size: 40 nm)

Other Components
Styrene acrylic resin (styrene-acrylic resin emulsion, average particle size: 40 nm);
Polyethylene wax ("AQUACER 515" commercially available from BYK Japan KK, wax emulsion composed of paraffin, average particle size: 40 nm);
1,2-hexanediol;
Acetylenic glycol surfactant ("Olfine E1010" commercially available from Nissin Chemical Industry Co., Ltd.);
2-pyrrolidone;
Propylene glycol;
Tripropanolamine;
Ethylenediaminetetraacetic acid (EDTA); and
Water

TABLE 1

| Materials | Example 1 (mass %) | Example 2 (mass %) | Example 3 (mass %) | Example 4 (mass %) | Comparative example 1 (mass %) | Comparative example 2 (mass %) | Comparative example 3 (mass %) | Comparative example 4 (mass %) | Comparative example 5 (mass %) |
|---|---|---|---|---|---|---|---|---|---|
| Styrene acrylic resin | 5.0 | 5.0 | 5.0 | 5.0 | 5.0 | 5.0 | 5.0 | 5.0 | 5.0 |
| Polyethylene wax | 2.0 | 2.0 | 2.0 | 2.0 | 2.0 | 2.0 | 2.0 | 2.0 | 2.0 |
| Weather resistance enhancer 1 | 0.5 | 1.0 | | | | | | 0.1 | |
| Weather resistance enhancer 2 | | | 1.0 | | | | | | |
| Weather resistance enhancer 3 | | | | 1.5 | | | | | 1.0 |
| Weather resistance enhancer 4 | | | | | | 1.0 | | | |
| Weather resistance enhancer 5 | | | | | | | 1.0 | | |
| 1,2-hexanediol | 5.0 | 5.0 | 5.0 | 5.0 | 5.0 | 5.0 | 5.0 | 5.0 | 5.0 |
| Acetylene glycol surfactant | 0.7 | 0.7 | 0.7 | 0.7 | 0.7 | 0.7 | 0.7 | 0.7 | 0.7 |
| 2-pyrrolidone | 4.0 | 4.0 | 4.0 | 4.0 | 4.0 | 4.0 | 4.0 | 4.0 | 4.0 |
| Propylene glycol | 10.5 | 9.0 | 12.0 | 12.0 | 12.0 | 6.0 | 9.0 | 12.0 | 12.0 |
| Tripropanolamine | 0.2 | 0.2 | 0.2 | 0.2 | 0.2 | 0.2 | 0.2 | 0.2 | 0.2 |
| EDTA | 0.02 | 0.02 | 0.02 | 0.02 | 0.02 | 0.02 | 0.02 | 0.02 | 0.02 |
| Pure water | Balance | Balance | Balance | Balance | Balance | Balance | Balance | Balance | Balance |

3.2. Preparation of Color Ink Composition 3.2.1. Preparation of Yellow Ink Composition A 2000 ml separable flask having an agitator, a condenser, a temperature sensor, and a dropping funnel was thoroughly purged with nitrogen gas, and then diethylene glycol monomethyl ether (200.0 parts by mass) was put into the separable flask and then heated to 80° C. while being stirred.

Diethylene glycol monomethyl ether (200.0 parts by mass), cyclohexyl acrylate (hereinafter referred to as "CHA", 483.0 parts by mass), methacrylic acid (hereinafter referred to as "MAA", 66.6 parts by mass), acrylic acid (hereinafter referred to as "AA", 50.4 parts by mass), and t-butyl peroxy-2-ethylhexanoate (hereinafter referred to as "BPEH", 4.8 parts by mass) were put into the dropping funnel and then transferred dropwise into the separable flask at 80° C. for 4 hr.

The resulting product was held at 80° C. for 1 hr, and then BPEH (0.8 parts by mass) was added to the product to promote a reaction at 80° C. for 1 hr. The product was aged, and then diethylene glycol monomethyl ether was removed by distillation under reduced pressure. Methyl ethyl ketone (hereinafter referred to as "MEK", 600.0 parts by mass) was added to the product to yield a solution of a polymeric composition for ink jet ink with 50% resin solids.

Part of the solution of a polymeric composition for ink jet ink was collected and then dried with an ignition dryer at 105° C. for 1 hr. The obtained solid matter of the polymeric composition for ink jet ink had an acid value of 130 mg KOH/g and a weight-average molecular weight of 34000.

Then, a 30% sodium hydroxide aqueous solution (6.0 parts by mass) was added to the solution of a polymeric composition for ink jet ink (120.0 parts by mass), and the product was stirred with a high-speed disperser for 5 min. A fluid dispersion containing C. I. Pigment Yellow 180 with a pigment concentration of 25 mass % (480.0 parts by mass) was added to the product and then stirred with a high-speed disperser for 1 hr to yield a pigment dispersion.

The produced pigment dispersion was mixed with components described in "Other Components" of "3.1. Preparation of Protective Ink Composition", and then the mixture was stirred to prepare a yellow ink composition.

3.2.2. Preparation of Other Color Ink Compositions

Other color ink compositions were prepared as in the preparation of the yellow ink composition except for changes in the colorant.

3.3. Evaluation

The evaluation tests described below were carried out with an ink jet printer "PX-5500" (commercially available from SEIKO EPSON CORPORATION) to which a cartridge filled with the protective ink composition composed of components shown in Table 1 and the color ink compositions prepared as described above was attached. The printer has a predetermined heater provided thereinside and a heating mechanism provided at a sheet discharge portion to expose a sheet to hot air.

3.3.1. Production of Evaluation Sample

Sample for Measurement of Light Transmittance

Evaluation samples were produced as described below. Droplets of the color inks were ejected from nozzle openings of the printer, and droplets of the protective ink were subsequently ejected to form clear coating films on a recording medium ("Lumirror S10" commercially available from Toray Industries, Inc.). The recording medium was heated at 40° C. during the application of the color inks and protective ink and then exposed to hot air at 60° C. for additional heating after the application of the inks.

The clear coating films were formed at an image resolution of 1440 dpi×1440 dpi with an amount of applied ink of 13.5 mg/inch$^2$.

Sample for Other Evaluation Items

Droplets of the color inks were ejected from nozzle openings of the printer to form coating films of the color inks on a recording medium as in the sample for measurement of light transmittance.

The protective ink composition was ejected from nozzle openings of the printer and applied onto the coating films of the color inks to form clear coating films covering the coating film of the color inks.

The coating films of the color inks were formed at an image resolution of 1440 dpi×1440 dpi and a Duty from 100% to 5% at 5% intervals. The clear coating films were formed under the same conditions as used in the production of the samples for measurement of light transmittance.

The term "Duty" herein used is a value determined from the following formula.

Duty (%)=number of actually printed dots/(vertical resolution×horizontal resolution)×100

In the formula, the term "number of actually printed dots" indicates the number of actually printed dots per unit area, and the terms "vertical resolution" and "horizontal resolution" each indicate resolution in a unit length.

3.3.2. Evaluation Test

Light Transmittance of Clear Coating Film

The light transmittance of each sample for measurement of light transmittance was measured at wavelengths of 320 nm to 780 nm with a spectrophotometer ("Spectrophotometer U330" commercially available from Hitachi, Ltd.) at a scan speed of 600 nm/min and a slit width of 2.0 nm. The light transmittance of the recording medium itself was measured, and then a difference spectrum in the measurement result between the recording medium itself and the recording medium on which the clear coating film had been formed was obtained. The obtained difference spectra were integrated for each nanometer with Expression (1).

$$\int_{320}^{380} T(x)dx \qquad \text{Expression (1)}$$

The following evaluation criteria were employed. Integrated value of light transmittance for each nanometer at wavelengths of 320 nm to 360 nm:
S: not more than 1000;
A: 1001 to 2000;
B: 2001 to 3000; and
C: not less than 3001.

Integrated value of light transmittance for each nanometer at wavelengths of 360 nm to 380 nm:
S: not more than 500;
A: 501 to 1000;
B: 1001 to 1500; and
C: not less than 1501.

Integrated value of light transmittance for each nanometer at wavelengths of 380 nm to 780 nm:
S: not less than 38000;
A: not less than 36000 and less than 38000;
B: less than 36000.

Optical Density

Evaluation samples were produced so as to have a patch pattern, and the patch pattern of each sample was subjected to measurement of optical density with a spectrophotometer (Gretag Macbeth SPM50 manufactured by GRETAG MACBETH AG). The measurement conditions were as follows: a light source of D50, no light source filter, a viewing angle of 2°, and reference white of absolute white. The following evaluation criteria were employed.

In coating films of color inks without coating films of the protective ink,
A: up to −3%;
B: −5% to −3%; and
C: not more than −5%.

Color Saturation

Evaluation samples were produced so as to have a patch pattern, and the patch pattern of each sample was subjected to analysis with a spectrophotometer (Gretag Macbeth SPM50 manufactured by GRETAG MACBETH AG) to determine coordinates in L*a*b* color space in accordance with definition of color difference by Commission International de l'Eclairage (CIE). The analytical conditions were as follows: a light source of D50, no light source filter, a viewing angle of 2°, and reference white of absolute white. The resulting value was put into the formula of $C^*[C^*=((a^*)^2+(b^*)^2)^{1/2}]$ to determine the color saturation of the patch pattern, and the color saturation was evaluated on the basis of the below criteria.

In coating films of color inks without coating films of the protective ink,
A: up to −3%;
B: −5% to −3%; and
C: not more than −5%.

Weather Resistance

Each evaluation sample was put into a chamber of a Xenon weather meter (commercially available from Suga Test Instruments Co., Ltd.) and subjected to a series of procedures including exposure to light for 40 min, exposure to light and water for 20 min, exposure to light for 60 min, and exposure to water for 60 min. The series of procedures were continuously carried out for two weeks, and the sample was retrieved four weeks later.

The retrieved sample was left to stand under a normal environment for 1 hr. The optical density of the sample was then measured with a Gretag densitometer (manufactured by GRETAG MACBETH AG) to determine a percent retention of optical density (%). Among three images with the initial optical density of 0.5, 1.0, and 1.5, the image exhibiting the smallest percent retention was selected for the evaluation. Evaluation criteria were as follows.

A: Optical density of not less than 60%;
B: Optical density of not less than 50% and less than 60%;
C: Optical density of not less than 30% and less than 50%; and
D: Optical density of less than 30%.

Abrasion Resistance

A color fastness rubbing tester AB-301 (commercially available from TESTER SANGYO CO., LTD.) was used to bring a friction block equipped with a JIS Test Fabric-Cotton into friction with coating films of color inks under conditions of a load of 500 g and friction of 50 times. Then, a surface of each coating film of color inks was visually observed. Evaluation criteria were as follows.

A: No damage on the coating film of color inks;
B: Damage on the coating film of color inks; and
C: Partial peeling of the coating film of color inks.

3.4. Results of Evaluation

Results of the above evaluations are shown in Tables 2 to 5.

TABLE 2

| | Light transmittance of coating film | | | Color development | | Weather resistance | Abrasion resistance |
|---|---|---|---|---|---|---|---|
| | 320 nm–360 nm | 360 nm–380 nm | 380 nm–780 nm | OD value | Color saturation | | |
| Example 1 | A | A | S | A | A | B | A |
| Example 2 | S | S | S | A | B | A | A |
| Example 3 | A | B | S | A | A | B | A |
| Example 4 | A | B | A | B | B | B | A |

TABLE 2-continued

| | Light transmittance of coating film | | | Color development | | Weather resistance | Abrasion resistance |
|---|---|---|---|---|---|---|---|
| | 320 nm–360 nm | 360 nm–380 nm | 380 nm–780 nm | OD value | Color saturation | | |
| No protective ink | — | — | — | — | — | — | C |

TABLE 3

| | Light transmittance of coating film | | | Color development | | Weather resistance |
|---|---|---|---|---|---|---|
| | 320 nm–360 nm | 360 nm–380 nm | 380 nm–780 nm | OD value | Color saturation | |
| Comparative Example 1 | C | C | S | A | A | D |
| Comparative Example 2 | S | A | B | C | B | A |
| Comparative Example 3 | A | C | B | C | B | C |
| Comparative Example 4 | C | C | S | A | A | D |
| Comparative Example 5 | B | B | S | A | A | C |

TABLE 4

| | Thickness (nm) | Light transmittance of coating film 320 nm–360 nm | Color development | | Weather resistance |
|---|---|---|---|---|---|
| | | | OD value | Color saturation | |
| Example 1 | 200 | A | A | A | B |
| | 100 | B | A | A | C |
| | 50 | C | A | A | D |
| Example 2 | 200 | S | A | B | A |
| | 100 | A | A | A | B |
| | 50 | B | A | A | C |
| Comparative Example 1 | 200 | C | A | A | D |
| | 100 | C | A | A | D |
| | 50 | C | A | A | D |

TABLE 5

| | Cyan (%) | Magenta (%) | Yellow (%) |
|---|---|---|---|
| Example 1 | 88 | 87 | 91 |
| Example 2 | 89 | 87 | 92 |
| No protective ink | 80 | 80 | 80 |

The results shown in Table 2 demonstrate that the evaluation samples of Examples had low light transmittance at wavelengths of 320 nm to 360 nm and high light transmittance at wavelengths of 380 nm to 780 nm and exhibited satisfactory weather resistance while maintaining color development properties such as optical density and color saturation. The protective ink composition was applied onto a color ink, which provided satisfactory fastness of the color ink to rubbing. The protective ink composition-free sample exhibited unsatisfactory weather resistance and fastness to rubbing.

The results shown in Table 3 demonstrate that the samples of Comparative Examples had high light transmittance at wavelengths of 320 nm to 360 nm, low light transmittance at wavelengths of 380 nm to 780 nm, or a combination thereof. In particular, the sample maintained color development while exhibiting unsatisfactory weather resistance or had satisfactory weather resistance while exhibiting unsatisfactory color development.

The results shown in Table 4 demonstrate that light transmittance at wavelengths of 320 nm to 360 nm became increased in proportion to a decrease in the thickness of the samples of Examples 1 and 2, resulting in a decrease in weather resistance. Hence, appropriate thickness needs to be employed with the aid of a weather resistance enhancer.

Percent retention of optical density in each of cyan, magenta, and yellow inks was observed in a recorded matter with no protective ink, and then the samples of Examples 1 and 2 with the protective ink were subjected to the similar observation under conditions in which the recorded matter with no protective ink exhibited a percent retention of optical density of 80% for each color; Table 5 shows results of a comparison of the obtained percent retention. The yellow ink exhibited high percent retention of optical density as compared with cyan and magenta inks, which indicates the protective ink composition highly worked on the yellow ink. In this case, the cyan ink composition contained a pigment being Pigment Blue 15:3, and the magenta ink composition contained a pigment being Pigment Red 122.

4. Modification

An ink composition was similarly prepared except that a yellow ink composition contained Pigment Yellow 155 in place of Pigment Yellow 180. The protective ink compositions of Examples 1 and 2 and Comparison Example 1 were used.

The analyses of optical density, color saturation, and weather resistance were carried out in the same manners as described above. In the analysis of weather resistance, the series of procedures were carried out for six weeks. Table 6 shows results of the analyses. The results shown in Table 6 demonstrate that the protective ink compositions provided satisfactory weather resistance in Examples.

TABLE 6

|  | Color development | | Weather resistance |
| --- | --- | --- | --- |
|  | OD value | Color saturation | |
| Example 1 | A | B | B |
| Example 2 | A | B | A |
| Comparative Example 1 | A | A | D |

Percent retention of optical density was similarly measured as in the measurement shown in Table 5 to analyze compatibility of the protective ink composition of Examples with Pigment Yellow 155, Pigment Blue 15:3, and Pigment Red 122. Table 7 shows analytical results. The results shown in Table 7 demonstrate that the yellow ink composition containing Pigment Yellow 155 exhibited good compatibility with the protective ink composition as compared with the cyan and magenta ink compositions containing different pigments.

TABLE 7

|  | Cyan (%) | Magenta (%) | Yellow (%) |
| --- | --- | --- | --- |
| Example 1 | 88 | 87 | 91 |
| Example 2 | 89 | 87 | 91 |
| No protective ink | 80 | 80 | 80 |

The invention should not be limited to the above embodiments and can be further variously modified. For example, the invention may include configurations substantially the same as those of the above embodiments (e.g., configurations having the same functions, processes, and results or configurations having the same advantages and effects). The invention may include configurations provided by changing non-essential parts of the configurations described in the above embodiments. The invention may include other configurations which provide the same advantages and effects as those described in the above embodiments. The invention may include configurations in which a traditional technique is added to the configurations described in the above embodiments.

What is claimed is:

1. An ink jet recording method, the method comprising forming a image on a recording medium by applying an image forming ink composition onto the recording medium, and then applying a protective ink composition onto the applied image forming ink composition using ink jet nozzles,
    wherein the protective ink composition contains a weather resistance enhancer and is substantially free from a colorant,
    the protective ink composition comprises at least any one of water and solvent in an amount of not less than 50%,
    the weather resistance enhancer is a material selected from the group of benzotriazole, benzophenone, Avobenzone, benzoylmethane, oxybenzone, cerium oxide, zinc oxide, and titanium oxide,
    wherein a coating film formed by the protective ink composition, which is applied onto the image forming ink composition, satisfies the following requirements:
    requirement (1): an integrated value of the light transmittance of the coating film for each nanometer is not more than 2000 at wavelengths of 320 nm to 360 nm,
    requirement (2) an integrated value of the light transmittance of the coating film for each nanometer is not less than 36000 at wavelengths of 380 nm to 780 nm further comprising, and
    requirement (3): an integrated value of the light transmittance of the coating film for each nanometer is not more than 1500 at wavelengths of 360 nm to 380 nm
    the image forming ink composition comprises a yellow ink composition and a non-yellow ink composition, and
    the image is formed by application of the yellow ink composition and application of the non-yellow ink composition and then the protective ink composition is applied,
    wherein an amount of the protective ink composition mainly applied is changed depending on regions where the yellow ink composition is applied or non-yellow ink composition is mainly applied, such that an amount of the protective ink composition applied on the region where the non-yellow ink composition is mainly applied is smaller than the amount of the protective ink composition applied on the region where the yellow ink composition is mainly applied.

2. The ink jet recording method of claim 1, wherein the protective ink composition is applied on a region where the yellow ink composition is mainly applied and the protective ink composition is not applied on a region where the non-yellow ink composition is mainly applied.

3. The ink jet recording method of claim 1, wherein the yellow colorant contained in the yellow ink composition is selected from C.I. Pigment Yellow 14, C.I. Pigment Yellow 17, C.I. Pigment Yellow 74, C.I. Pigment Yellow 109, C.I. Pigment Yellow 120, C.I. Pigment Yellow 150, C.I. Pigment Yellow 155, C.I. Pigment Yellow 180, C.I. Pigment Yellow 185, C.I. Pigment Yellow 213, a pigment having a structure represented by Formula (1), tautomers of the pigment having the structure represented by Formula (1), salts of the pigment having the structure represented by Formula (1), and hydrates of the pigment having the structure represented by Formula (1),

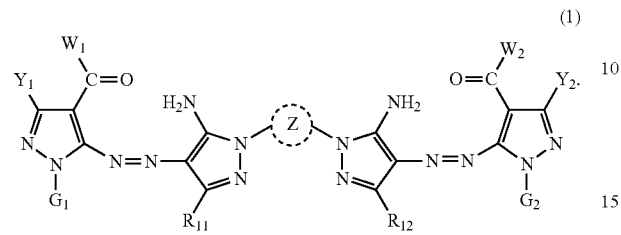

(1)

4. The ink jet recording method of claim 1, wherein the image forming ink composition further comprises
a cyan ink composition containing phthalocyanine as a cyan colorant and
a magenta ink composition containing quinacridone as a magenta colorant.

5. The ink jet recording method of claim 1, wherein a thickness of the coating film formed by the protective ink composition is 50 nm to 300 nm.

6. The ink jet recording method of claim 1, wherein the recording medium exhibits poor absorbability or non-absorbability to ink.

7. The ink jet recording method of claim 1, wherein the amount of the protective ink composition applied to the recording medium is adjusted based on light resistance.

* * * * *